United States Patent
Yamaguchi et al.

(10) Patent No.: US 7,258,154 B2
(45) Date of Patent: Aug. 21, 2007

(54) APPARATUS AND PROCESS FOR MANUFACTURING DISC ROTOR

(75) Inventors: Tomohiro Yamaguchi, Toyota (JP); Tomiyuki Murayama, Toyota (JP)

(73) Assignee: Aisin Takaoka Co., Ltd., Toyota, Aichi Pref. (JP)

(*) Notice: Subject to any disclaimer, the term of this patent is extended or adjusted under 35 U.S.C. 154(b) by 544 days.

(21) Appl. No.: 10/970,611

(22) Filed: Oct. 21, 2004

(65) Prior Publication Data

US 2006/0085968 A1    Apr. 27, 2006

(30) Foreign Application Priority Data

Oct. 23, 2003   (JP) .............................. 2003-362720
Jul. 16, 2004   (JP) .............................. 2004-209511

(51) Int. Cl.
     *B22D 19/00* (2006.01)
(52) U.S. Cl. .................. 164/112; 164/120; 164/332
(58) Field of Classification Search .............. 164/112, 164/332–333, 120, 319–320; 264/272, 275–278; 425/125, 127, 129.1
     See application file for complete search history.

(56) References Cited

U.S. PATENT DOCUMENTS 6,648,055 B1    11/2003    Haug et al.
2003/0038001 A1  2/2003    Yamaguchi et al.

FOREIGN PATENT DOCUMENTS

| DE | 199 17 175 A1 | 10/2000 |
| JP | 01-272725 | 10/1989 |
| JP | 2001-205416 | 7/2001 |
| JP | 2003-139172 | 5/2003 |
| WO | WO 00/62959 | 10/2000 |

OTHER PUBLICATIONS

British Search Report, dated Dec. 7, 2004 (1 page).
Correspondence From German Patent Office, 2 page, dated Jan. 5, 2006.

*Primary Examiner*—Kuang Y. Lin
(74) *Attorney, Agent, or Firm*—Welsh & Katz, Ltd.

(57) ABSTRACT

An apparatus and process for manufacturing a disc rotor made of a metal-based composite material, which enables stabilization of a preform support within a disc rotor casting cavity while minimizing likelihood of damaging of preforms. The apparatus comprises a lower die 10 and a movable core assembly 20 which constitutes a disc rotor casting cavity 18; a preform supporting portion 24a which is provided on a movable core assembly 20; a pressurizing and shaping portion 32 of an upper die 30 for applying pressure upon a molten metal accommodated in the cavity 18; and a preform biasing mechanism 40 having a biasing face 41b which can be brought into a face-to-face contact with the upper face of a preform 5 which is supported on the preform supporting portion 24a. On application of pressure upon the molten metal, the preform biasing mechanism 40 biases the preform 5 via the biasing face 41b to prevent the preform 5 from being shifted due to an increase in the pressure upon the molten metal.

9 Claims, 5 Drawing Sheets

MOVABLE CORE ASSEMBLY 20: EXTENDED STATE
LOWER DIE 10: UPPER STAND-BY POSITION

FIG. 1

MOVABLE CORE ASSEMBLY 20: EXTENDED STATE
LOWER DIE 10: UPPER STAND-BY POSITION

FIG. 2

MOVABLE CORE ASSEMBLY 20: ASSEMBLED STATE
LOWER DIE 10: LOWER CASTING POSITION

APPARATUS AND PROCESS FOR MANUFACTURING DISC ROTOR

FIELD OF THE INVENTION

The present invention relates to an apparatus and process for manufacturing a disc rotor made of a metal-based composite material including a preform, used for disc brake systems.

BACKGROUND OF THE INVENTION

In the field of disk rotor for brake systems, transition of rotor materials from cast iron to light metals such as aluminum has been accelerated in view of reducing the weight of the disc rotor. Research and development relating to the use of metal-based composite materials i.e., Metal Matrix Composite (MMC) including a matrix of aluminum or its alloy and a preform in order to compensate for the insufficient strength and wear-resistance of only aluminum has been actively conducted. A process for manufacturing an aluminum MMC rotor comprising the steps of supporting a porous preform in position in a cavity of a die, and impregnating the preform with molten aluminum which is cast into the cavity in accordance with a pressurizing cast method for conducting die casting has been known. This type of manufacturing process has an important technical object how the preform is stably supported within the cavity.

In a process for manufacturing a fiber reinforced metal member of, for example, Patent Document 1, a portion of molded fiber article (a kind of a porous preform) which is fitted (or set) on a core or die is made so that the fitted portion has a fiber density lower than that of the other portion. By adapting the low density portion of the molded fiber article to the core or the die while it is compacted, the fiber density of the molded fiber article is unified over the entire thereof on setting of the article to the core or die and the molded fiber article in interest is held in a desired position in the casting cavity by a biasing force generated by an elastic action caused on compaction for suppressing the shift of the position of the molded fiber article due to pressurizing casting of a molten metal.

Patent Document 2 discloses that an apparatus for manufacturing a disc rotor wherein a molten metal is poured into a cavity and pressurized while supporting and fixing a preform in the cavity formed by a lower die and an upper die which are provided movable toward and away each other. The apparatus comprises a movable core assembly made up of a plurality of divided core segments which are disposed in an annular manner and are movable in a radial direction, the movable core assembly selectively assuming either one of open and closed states, in an open state the plurality of the core segments being movable in an outer radial direction to allow the preform to be introduced into said cavity, and, in a closed state the plurality of the core segments being movable in an inner radial direction to form a preform supporting portion for supporting the outer periphery of at least one preform.

[Patent Document 1]

Japanese Patent Kokai Publication No. 01-272725 (pages 1 and 2)

[Patent Document 2]

Japanese Patent Kokai Publication No. 2003-139172 (claim 6)

SUMMARY OF THE DISCLOSURE

However, if the technology of Patent Document 1 is tried to use for manufacturing a disc rotor, it is necessary to set the molded fiber article to the die or the core which constitutes a part of the die while the article is compressed. When the compressive strength is misadjusted, the molded fiber article can not withstand the compressive stress so that it may be damaged. It is also necessary to make a molded fiber article having a locally different fiber density. The burden and cost of manufacturing it are enormous. Thus, it is not easy to apply the technology of Patent Document 1 to the manufacturing of the disc rotor.

Patent Document 2 does not disclose a preform biasing mechanism being adapted to prevent the shifting of said preform due to an increase in the pressure upon the molten metal by biasing said preform via said biasing face on application of a pressure upon said molten metal.

It is an object of the present invention to provide an apparatus and process for manufacturing a disc rotor made of a metal-based composite material including a preform, which enables the stabilization of the preform support in the disc rotor casting cavity while minimizing the likelihood of the damages of the preform. It is another object of the present invention to provide an apparatus and process for manufacturing a disc rotor in which restrictions of usable preform are reduced and an improvement in the manufacturing efficiency and reduction in manufacturing cost can be achieved.

The invention as defined in Claim 1 (a first aspect of the present invention) resides in an apparatus for manufacturing a disc rotor made of a metal-based composite material including a preform. The apparatus comprises a cavity forming die which forms a disc rotor casting cavity for accommodating said preform and a molten metal therein; a preform supporting portion which is provided on a part of said cavity forming die to define the position of said preform in said cavity; a molten metal pressurizing unit for applying a pressure upon the molten metal accommodated in said cavity; and a preform biasing mechanism which is provided so that it can be relatively moved toward and away from said preform supported by said preform supporting portion; said preform having a biasing face which can be in a face-to-face contact with a flat face of said preform; said preform biasing mechanism being adapted to position said preform in said cavity in conjunction with said preform supporting portion and to prevent the shifting of said preform due to an increase in the pressure upon the molten metal by biasing said preform via said biasing face on application of a pressure upon said molten metal by said molten metal pressurizing unit.

In accordance with the invention (apparatus) as defined in Claim 1 (first aspect of the present invention), positioning of the preform in the cavity is conducted by the cooperation between the preform supporting portion which is provided on a part of the cavity forming die and the preform biasing mechanism (for example, by sandwiching the preform between the preform supporting portion and the preform biasing mechanism). Accordingly, the preform can be positively retained in a position which is defined by the preform supporting portion. Since the preform biasing mechanism can be relatively moved toward or away from the preform supported by the preform supporting portion, the cooperation relationship between the preform and the preform supporting portion is easy to keep even if the shape and/or size of the preform is changed (for example, the thickness of the preform is changed). The freedom degree to cope with the change of the preform is high. Therefore, the present apparatus has an advantage that restrictions of the usable preforms are reduced, so that it is easy to cope with the changes in design of the disc rotor.

The molten metal in the cavity is prevented from leaking therefrom due to the fact that the biasing face of the preform biasing mechanism is brought into a face-to-face contact with the flat face of the preform which is supported by the preform supporting portion. Pressurizing of the molten metal by the molten metal pressurizing unit causes the molten metal to impregnate the preform. Shifting of the preform due to an increase in the pressure applied upon the molten metal in the cavity is prevented due to the fact that the preform which is positioned in the position defined by the preform supporting portion is biased by the biasing face of the preform biasing mechanism. Since the preform biasing mechanism is in a face-to-face contact with the preform via its biasing face, the biasing force of the preform biasing mechanism will not be concentrated on a very narrow area of the preform. The likelihood of damage of the preform by the biasing force is very low. Accordingly, the present apparatus can achieve the stabilization of the preform supporting in the disc rotor casting cavity while minimizing the likelihood of the damage to the preform.

The invention as defined in Claim 2 is further characterized in that the molten metal pressurizing unit comprises a substantially cylindrical pressurizing and shaping portion for shaping a central recess of the disc rotor while applying a pressure upon the molten metal accommodated in the cavity; and a pressurizing and shaping portion drive mechanism for driving the pressuring and shaping portion in a direction along the central axis of the cavity so that the pressurizing and shaping portion is movable toward or away from the cavity.

In accordance with the invention of Claim 2, the substantially cylindrical pressurizing and shaping portion for forming the central recess of the disc rotor can be moved toward or away from the cavity along the central axis of the cavity by means of the pressurizing and shaping portion drive mechanism. Accordingly, the substantially cylindrical pressurizing and shaping portion is moved into the molten metal charged in the cavity by the action of the pressurizing and shaping portion drive mechanism, so that the molten metal is pressurized. As a result, impregnation of the preform with the molten metal and shaping of the central recess of the disc rotor corresponding to the shape of the pressurizing and shaping portion is simultaneously achieved.

The invention as defined in Claim 3 is further characterized in that the preform biasing mechanism comprises positioning member having the biasing face and an annular shape which enables the positioning member to be fitted on the substantially cylindrical pressurizing and shaping portion from an external position, the positioning member being movable in a direction along the central axis of the cavity independently of the pressurizing and shaping portion; and a positioning member drive mechanism for driving the positioning member in a direction along the central axis of the cavity so that the positioning member can be moved toward or away from the preform supported by the preform supporting portion.

In accordance with the invention of Claim 3, the annular positioning member which constitutes the preform biasing mechanism is movable in a direction along the central axis of the cavity (in a direction toward or away from the pressurizing and shaping portion or in a direction toward or away from the preform supported by the preform supporting portion) independently of the substantially cylindrical pressurizing and shaping portion which forms molten metal pressurizing unit. Accordingly, positioning of the preform can be achieved by independently moving the positioning member to a position in which the biasing face of the positioning member comes into a face-to-face contact with the flat face of the preform prior to actuating of the substantially cylindrical pressurizing and shaping portion. Even if the pressure on the molten metal (that is, the inner pressure in the cavity) is gradually increased as the pressurizing and shaping portion advances into the molten metal in the cavity, the biasing force of the biasing face of the positioning member applied on the flat face of the preform can be changed in step with the change in the pressure on the molten metal. Thus, the damaging to the preform can be positively prevented and the preform can be retained to a desired position in the cavity.

The invention as defined in Claim 4 is further characterized in that the apparatus further includes control unit which is electrically or mechanically connected to at least the preform biasing mechanism and detects a pressure which is applied upon the molten metal by the molten metal pressurizing unit for controlling a biasing force of the biasing face applied upon the preform depending upon the pressure applied on the molten metal.

In accordance with the invention of Claim 4, the control unit which is electrically or mechanically connected to at least the preform biasing mechanism detects the pressure applied on the molten metal by the molten metal pressurizing unit for controlling the biasing force of the biasing face of the preform biasing mechanism applied upon the flat face of the preform supported by the preform supporting portion depending upon the pressure on the molten metal. Accordingly, feedback control of the preform biasing mechanism can be achieved so that the biasing force of the biasing face applied upon the flat face of the preform can be changed depending upon and in response to the change in the pressure on the molten metal even if the molten metal pressurizing unit gradually increases the pressure on the molten metal (that is, inner pressure in the cavity). Specifically, control can be achieved so that the pressure applied upon the molten metal by the molten metal pressurizing unit is constantly balanced with the biasing force applied on the preform by the biasing face of the preform biasing mechanism. Therefore, the preform can be retained to a desired position in the cavity while preventing unexpected damage of the preform due to the difference between the pressure applied on the molten metal by the molten metal pressurizing unit and the biasing force applied upon the preform by the biasing face of the preform biasing mechanism.

The invention as defined in Claim 5 is further characterized in that the cavity forming die at least comprises a lower die which forms a bottom wall of a cavity and a movable core assembly provided on the lower die for forming the inner side wall of the cavity; that the movable core assembly comprises a plurality of core segments which are disposed in an annular manner around the central axis of the cavity and are movable in a radial direction of the cavity; the movable core assembly selectively assuming either one of an extended state in which all the core segments are moved in an outer radial direction to allow the preform to be introduced into the cavity and an assembled state in which all the core segments are moved in an inner radial direction to form the inner peripheral side wall of the cavity; and in that all or some of the plurality of core segments are formed on an inner periphery thereof with the preform supporting portion.

In accordance with the invention of Claim 5, the movable core assembly which constitutes the inner peripheral side wall of the cavity comprises a plurality of core segments which are disposed in an annular manner around the central axis of the cavity and are movable in a radial direction of the cavity. The movable core assembly can selectively assume either one of extended and assembled states, wherein in the extended state all of the core segments are moved in an outer radial direction and in the assembled state all of the core segments are moved in an inner radial direction. Since all of the core segments are separated from the central axis of the cavity when the movable core assembly is in the extended state, the core segments and the preform supporting portion formed in the inner periphery of the segments will not become an obstacle, so that the preform can be smoothly introduced into the cavity without being hindered by the segments or preform supporting portion. When the movable core assembly is in the assembled state, all of the core segments are close to the central axis of the cavity to form an inner peripheral side wall of the cavity and the preform supporting portion which is provided on the inner periphery of the core segments is capable of performing the function of positioning of the preform in the cavity in conjunction with the preform biasing mechanism.

The invention as defined in Claim 6 resides in a process for manufacturing a disc rotor made of a metal-based composite material including a preform by using an apparatus comprising a cavity forming die which forms a disc rotor casting cavity, a preform supporting portion which is provided on a part of the cavity forming die, a molten metal pressurizing die for applying a pressure upon a molten metal accommodated in the cavity and a preform biasing mechanism having a biasing face which can be in a face-contact with a flat face of the preform. The process is characterized in that the process comprises a preparatory step for bringing the biasing face of the preform biasing mechanism into a face-to-face contact with the flat face of the preform supported by the preform supporting portion to position the preform in the cavity; and a step of applying a pressure upon the molten metal accommodated in the cavity by the molten metal pressurizing die; at the pressurizing step the pressure applied upon the molten metal by the pressurizing die being constantly balanced with the biasing force applied upon the preform by the preform biasing mechanism by gradually increasing the force for biasing the flat face of the preform by the biasing face of the preform biasing mechanism in step with an increase in pressure applied upon the molten metal by the pressurizing die.

The invention of Claim 6 (the second aspect of the present invention) generally resides in a process for manufacturing a disc rotor made of a metal-based composite material including a preform by using an apparatus for manufacturing a disc rotor of the first aspect (Claims 1 to 5). In accordance with the process of Claim 6, the pressure applied on the molten metal by the molten metal pressurizing die is constantly balanced with the biasing force applied upon the preform by the preform biasing mechanism by gradually increasing the biasing force applied on the flat face of the preform by the biasing face of the preform biasing mechanism in step with an increase in pressure applied on the molten metal when the molten metal in the cavity is pressurized by the molten metal pressurizing die. Accordingly, any pressure difference between the flat face of the preform with which the biasing face of the preform biasing mechanism is in a face-to-face contact and the face opposite thereto is prevented from occurring. As a result, the preform can be retained in a desired position in the cavity while preventing unexpected damage of the preform due to the pressure difference.

More preferable embodiments and additional constitutional requirements of the present invention will be described.

(a) In the 1st through 6th aspects, said preform is made of a non-compressive porous inorganic sintered material. (b) In the 1st through 6th aspects, the disc rotor casting cavity is formed as a cavity (casting space) having a rotary symmetry, so that the central axis of the disc rotor casting cavity is aligned with that of the disc rotor to be manufactured.

According to a third aspect of the present invention, there is provided an apparatus for manufacturing a disc rotor made of a metal-based composite material including at least one preform, characterized in that the apparatus comprises a cavity forming die and a core disposed in the die to form a disc rotor casting cavity for accommodating the preform and a molten metal therein; a molten metal pressurizing unit for applying a pressure upon the molten metal accommodated in the cavity; a preform supporting portion which is provided on a part of the core to support a lower face of the preform; a preform positioning member to abut to an upper face of the preform and to bias the preform between the preform supporting portion and the preform positioning member; a preform positioning member drive mechanism for biasing the preform positioning member toward the preform; an applied pressure sensor for detecting a pressure on the preform positioning member via the preform applied by the molten metal, which are poured into the cavity and are pressurized by the molten metal pressurizing unit; a control device for controlling the applied pressure on the preform applied by the preform positioning member drive mechanism with reference to information on the applied pressure input from the applied pressure sensor.

In accordance with the apparatus of manufacturing a disc rotor of the third aspect, stabilization of the preform support in the disc rotor casting cavity can be achieved while minimizing the likelihood of damaging of the preform. In accordance with this manufacturing apparatus, since the restrictions on the usable preform are reduced and the freedom degree to cope with the change in the preform shape is high, an improvement in the working efficiency and reduction in manufacturing cost can be achieved.

The third aspect of the present invention provides an apparatus for manufacturing a disc rotor, further characterized in that the cavity forming die comprise a lower die and an upper die; and that the molten metal pressurizing unit is disposed in a center portion of the upper die to be movable into the cavity and that the preform positioning member has an annular shape and is disposed around the molten metal pressurizing unit in the upper die to be vertically movable.

In accordance with the apparatus of manufacturing a disc rotor, the apparatus can be made compact.

The third aspect of the present invention provides an apparatus for manufacturing a disc rotor, further characterized in that the preform has an annular shape; that the preform supporting portion has an annular surface which comes into a face-to-face contact with an outer periphery of a lower face of the preform of annular shape, and that the preform positioning member has an annular surface which comes into a face-to-face contact with an upper face of the preform of an annular shape.

In accordance with the apparatus of manufacturing a disc rotor, preform supporting can be stabilized while the molten metal pressurizing.

The meritorious effects of the present invention are summarized as follows.

In accordance with the apparatus of manufacturing a disc rotor as defined in any of Claims 1 through 5, stabilization of the preform support in the disc rotor casting cavity can be achieved while minimizing the likelihood of damaging of the preform. In accordance with this manufacturing apparatus, since the restrictions on the usable preform are less and the freedom degree to cope with the change in the preform shape is high, an improvement in the working efficiency and reduction in manufacturing cost can be achieved.

In accordance with the process for manufacturing a disc rotor as defined in Claim 6, unexpected damage of the preform due to the pressure difference between the flat face side of the perform which comes into a face-to-face contact with the biasing face of the preform biasing mechanism and its opposite face can be prevented by preventing such pressure difference from occurring and the preform can be stably retained in desired position in the cavity.

PREFERRED EMBODIMENTS OF THE INVENTION

The present invention will be described by way of an embodiment in which an apparatus and method of producing an aluminum MMC disc rotor is embodied with reference to the drawings.

(Disc Rotor)

Figure 6:
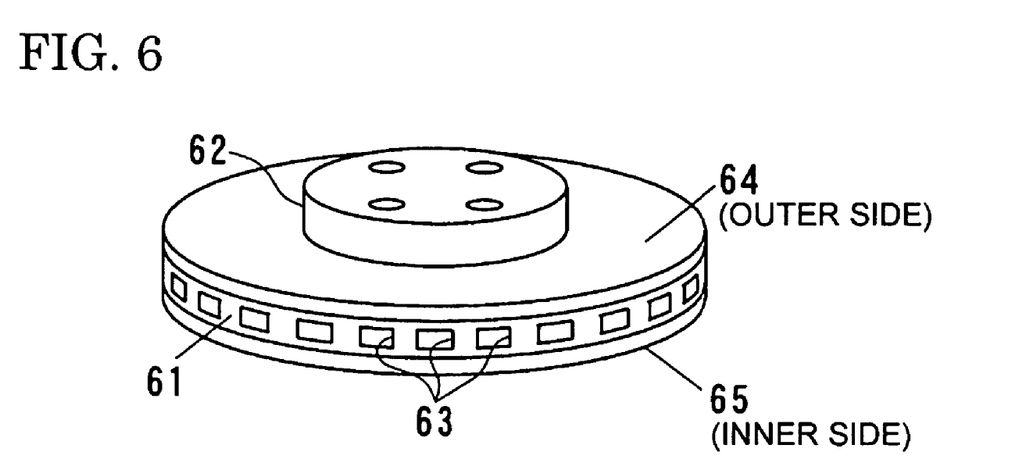
FIG. 6 is a perspective view showing a ventilated type disc rotor which is to be manufactured.

FIG. 6 shows the summary of a ventilated type of an aluminum MMC disc rotor which is to be produced. The disc rotor comprises a main body 61 which is substantially disc shaped and a cylindrical portion 62 having a top face, which is projected from the upper surface of the main body 61 in the center thereof. The cylindrical portion 62 has a diametric (cross) section which is in the form of a hat. The cylindrical portion 62 is provided in the inside thereof with an central recess (not shown) which opens to the main body 61 (face of the main body 61 opposite to the cylindrical portion). The main body 61 is formed with a plurality of vent holes 63 which open to the outer periphery thereof and extend generally in a radial direction thereof. The main body 61 is provided on the outer and inner sliding faces thereof with outer and inner composite material portions 64 and 65, respectively.

The main body 61 and the cylindrical portion 62 of the disc rotor are made of aluminum (or its alloy) (aluminum/ alloy may be referred to as simply "aluminum" in this application.) while the outer and inner composite material portions 64 and 65 are made by impregnating a ring-shaped preforms 4 and 5 (refer to FIGS. 1 to 3), respectively, with aluminum or its alloy. The preform may include a porous ceramic sintered article which is made by molding ceramic particles of silicon carbide and the like and then firing (sintering) them, a porous metal oxide solid article which is made by molding particles of alumina and the like, and then pressurizing or firing them for solidification, or a molded fiber article in which inorganic fibers of metal or ceramics are molded. The mechanical strength and wear-resistance of the sliding portions can be improved by forming the sliding portions of the disc rotor of composite material portions 64, 65 in which such a preform is impregnated with a metal.

(Apparatus for Manufacturing Disc Rotor)

Figure 1:
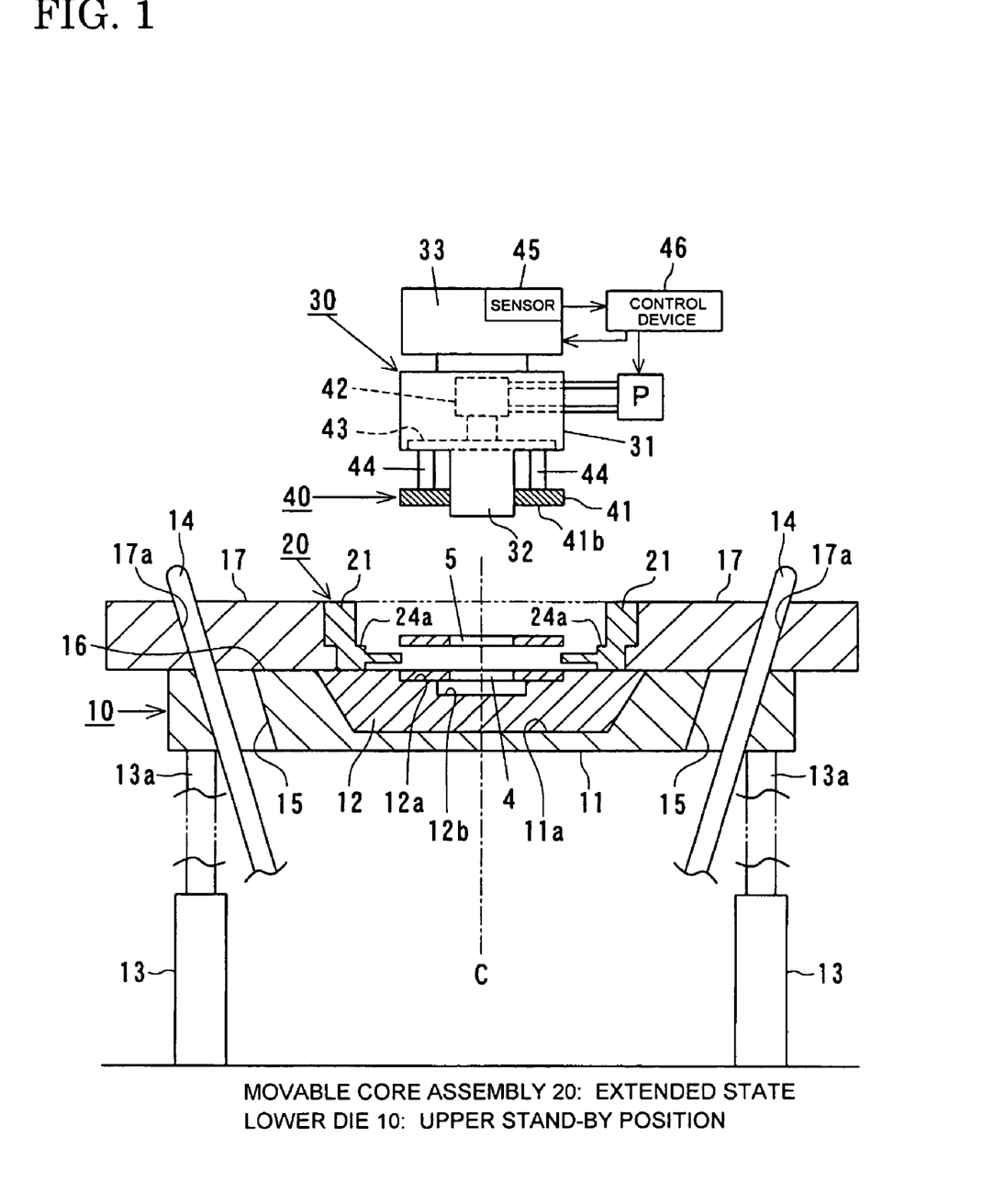
FIG. 1 is a schematic sectional view showing an apparatus for manufacturing a disc rotor when the movable core assembly is in an extended state.
Figure 2:
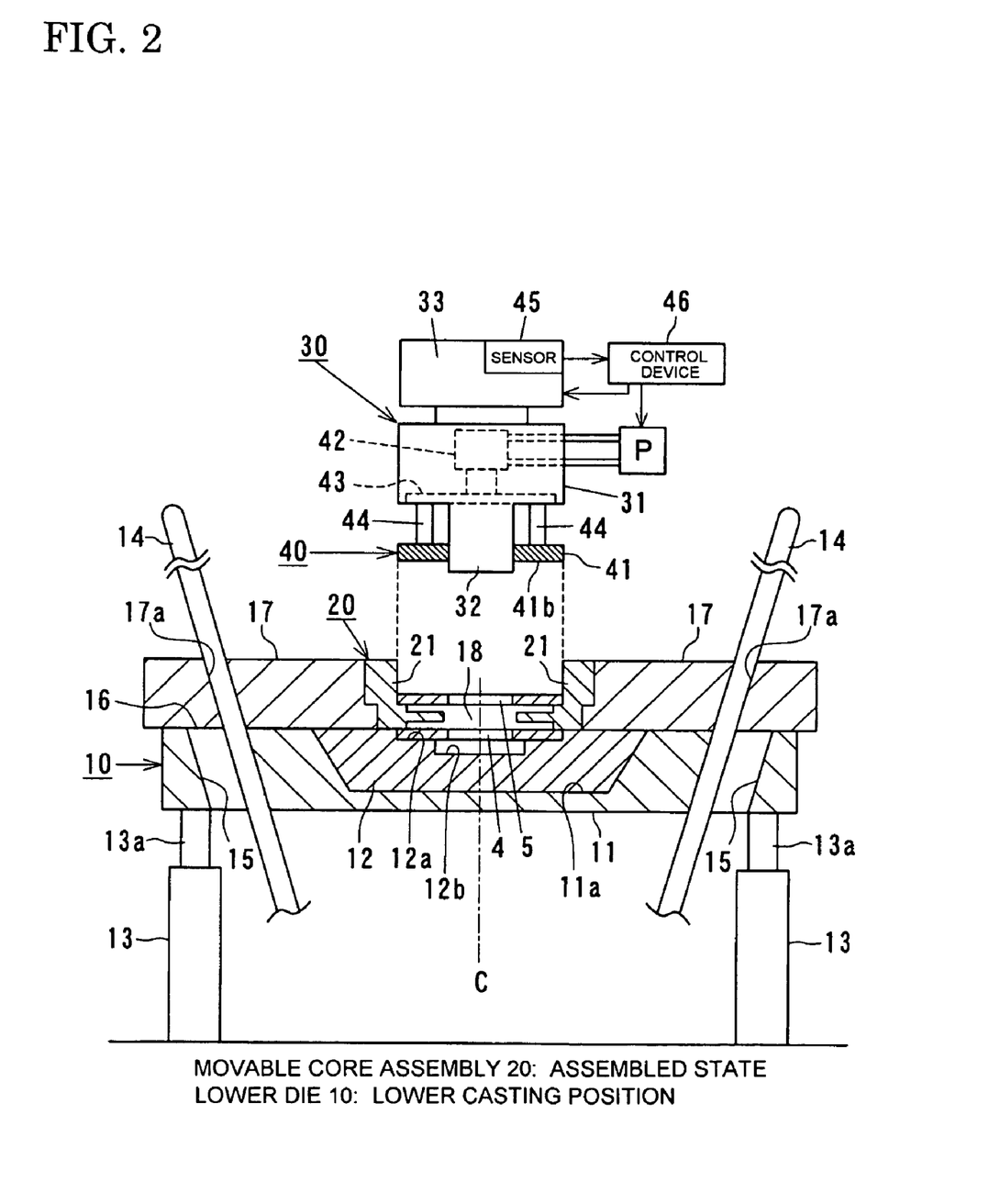
FIG. 2 is a schematic sectional view showing an apparatus for manufacturing a disc rotor when the movable core assembly is in an assembled state.

As shown in FIGS. 1 and 2, an apparatus for manufacturing a disc rotor comprises a disc-shaped lower die 10 which is located in the lower position of the apparatus, a special movable core assembly 20 which is located on the lower die 10, an upper die 30 above the lower die and movable core assembly so that the die 30 is movable toward and away from the lower die 10, and a preform biasing mechanism 40 which is provided together with the upper die 30.

The lower die 10 comprises a disc-shaped support platen 11 and a lower die main body 12. The lower die main body 12 is adapted in and fixed to a recess 11a which is formed in the center of the support platen 11 and is circular as viewed from the top of the drawing. The upper end face of the support platen 11 is flush with that of the lower die main body 12 to form a flush horizontal guide face 16. The lower die 10 is formed on the upper face and in the center thereof with a casting recess 12b having an annular step (stepped recess) 12a. The step 12a has a diameter and depth which substantially correspond to those of a first preform 4 (outer preform). The first preform 4 is placed within the step 12a. A plurality of drive actuators 13 (four actuators in the present embodiment) stand below the support platen 11 so that they surround the central axis C of the apparatus. The rod 13a of each drive actuator is linked with the bottom of the support platen 11. The lower die 10 is horizontally supported by these drive actuators 13 and is moved upward or downward along the central axis C depending upon the extension or retraction of the actuator's rods 13a while keeping its horizontal state. The lower die 10 can be moved between an upper stand-by position shown in FIG. 1 and a lower casting position shown in FIG. 2.

The manufacturing apparatus further comprises a plurality of (36 pins in the present embodiment) inclined pins 14 which are supported on and secured to the securing portion (not shown) provided below the support platen 11. The inclined pins 14 are disposed at equal spaces around the central axis C of the apparatus. Each of the pins 14 is inclined so that the upper end thereof is more separated from the central axis C in an outer radial direction of the lower die 10. The support platen 11 is formed with radially extending elongated holes or grooves 15 which are as many as the number of the inclined pins 14. Disposing of the inclined pins 14 in these elongated holes or grooves 15 respectively, prevents the interference between the support platen 11 and each inclined pin 14 caused by vertical motion of the lower die 10.

Sliders 17 which are as many as the number of the inclined pins 14 are placed on the upper face of the lower die 10 (horizontal guide face 16). The sliders 17 are disposed around the central axis C of the apparatus in an equally spaced and radial manner. Each slider 17 is formed with an inclined guide hole 17a extending therethrough, through which corresponding inclined pin 14 is passed. All of the sliders 17 are slidable in a radial direction (direction toward or remote from the central axis C) of the apparatus in synchronization with each other in association with the upward or downward movement of the lower die 10 based upon the guide relationship between the guide holes 17a and the inclined pins 14. Specifically, each slider 17 slides in an outer radial direction (direction remote from the central axis C) as the lower die 10 moves upward and slides in an inner radial direction (direction toward the central axis C) as the lower die moves downward.

Figure 4:
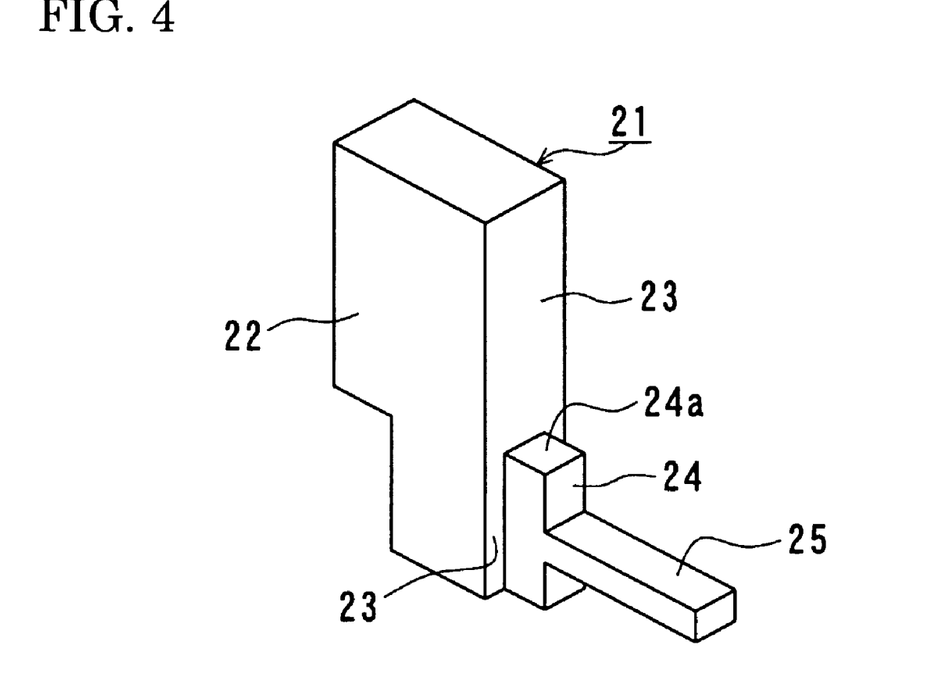
FIG. 4 is a perspective view showing a core segment which forms a movable core assembly.

A core segment 21 is integrally formed with the end of each slider 17 which is close to the central axis C. As shown in FIG. 4, the core segment 21 comprises a block-shaped main body 22 having a vertical front face 23, a support projecting portion 24 provided on the vertical front face 23, and a vent hole forming portion 25 which is projected from the support projecting portion 24 in a front direction. The upper end face 24a of the support projecting portion 24 intersects with the vertical front face 23 at right angles. When the core segments 21 are disposed on the horizontal guide face 16 together with the sliders 17, the upper end faces 24a of the support projecting portions 24 provide a horizontal preform supporting portion. The movable core assembly 20 is formed by arranging the plurality of core segments 21 which are integral with the sliders 17 in an annular manner around the central axis C.

The movable core assembly 20 assumes an expanded state or assembled state depending upon the height elevation of the lower die 10. That is, if all of the sliders 17 and the core segments 21 are moved in an outer radial direction of the apparatus due to the fact that the lower die 10 is disposed in an upper stand-by position as shown in FIG. 1, they assume the extended state in which all of the core segments are most remote to one another. In contrast to this, if all of the sliders 17 and the core segments 21 are moved in an inner radial direction due to the fact that the lower die 10 is disposed in a lower casting position as shown in FIG. 2, they assume the assembled state in which the core segments 21 are moved closest to each other. In the assembled state, the vertical front faces 23 of the core segments 21 are gathered to form an inner peripheral side wall of a disc rotor casting cavity 18. At this time, the lower die 10 forms the bottom wall of the cavity 18. The central axis of the cavity 18 is aligned with the central axis C of the apparatus. On the other hand, in the extended state, all of the core segments 21 are extended to the most outer limit. It becomes possible or easy to introduce preforms 4, 5 into a cavity area surrounded by the core segments 21 from an external position.

As shown in FIGS. 1 and 2, the upper die 30 and the preform biasing mechanism 40 are disposed above the lower die 10 and movable core assembly 20. The upper die 30 comprises a housing 31 and a cylindrical pressurizing and shaping portion 32 which projects from the bottom of the housing 31. The pressurizing and shaping portion 32 has a diameter which is preset slightly smaller than that of the central holes of the ring-shaped preforms 4, 5. The upper die 30 is operatively linked with an upper die drive mechanism 33, so that the upper die 30 can be moved upward or downward along the central axis C of the apparatus by the upper die drive mechanism 33. As the upper die 30 moves upward or downward, the pressurizing and shaping portion 32 moves into or away from the cavity 18 which is defined by the lower die 10 and the movable core assembly 20 in the assembled state. Therefore, the upper die drive mechanism 33 also functions as a pressurizing and shaping portion drive mechanism for moving the pressurizing and shaping portion 32 toward or away from the cavity 18.

Figure 5:
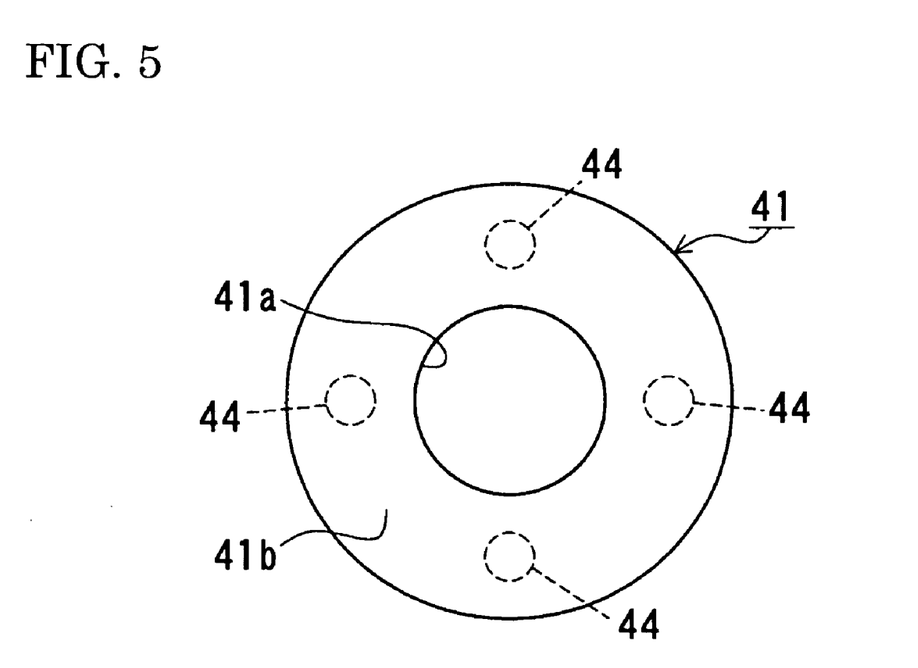
FIG. 5 is a bottom view showing a positioning member.

The cylindrical pressurizing and shaping portion 32 is provided on the periphery thereof with an annular positioning member 41. As shown in FIG. 5, the positioning member 41 is formed with a central hole 41a having an inner diameter corresponding to the diameter of the pressurizing and shaping portion 32, and extending through the member 41. The positioning member 41 is externally fitted to the pressurizing and shaping portion 32 in such a manner that the pressurizing and shaping portion is inserted into the central hole 41a (refer to FIG. 1). The positioning member 41 is vertically movable along the pressurizing and shaping portion 32 independently of the pressurizing and shaping portion 32. That is, the pressurizing and shaping portion 32, as the molten metal pressurizing unit, is disposed in the center portion of the upper die 30 to be movable into the cavity, the preform positioning member 41 has an annular shape and is disposed around the pressurizing and shaping portion 32 in the upper die 30 to be vertically movable. The positioning member 41 has a diameter which is preset to substantially correspond to that of the cavity 18 defined by the assembled movable core assembly 20 (i.e. the distance between the vertical front faces 23 of two core segments 21 which are radially opposite to each other). Accordingly, even when the movable core assembly 20 is in an assembled state, the positioning member 41 is vertically slidable along the inner peripheral side wall of the cavity 18 which is defined by the movable core assembly 20. The positioning member 41 is formed on the lower face thereof with a smooth biasing face 41b which can be in a face-to-face contact with the upper flat face of the second preform 5 (inner preform). The biasing face 41b of the positioning member 41 has an identical size and shape of the upper flat face of the second preform 5, so that they can be in full contact with each other.

Hydraulic actuators 42 and actuating plate 43 which is moved upward or downward by the hydraulic actuators 42 are provided within the housing 31 of the upper die. A plurality of actuating rods 44 (four rods in the present embodiment) which project downward from the lower face of the housing 31 are secured to the actuating plate 43. The positioning member 41 is linked with the actuating plate 43 via the actuating rods 44. The actuating plates 43 prevent the positioning member 41 from dropping from the pressurizing and shaping portion 32 and transmit to the positioning member 41 a pressurizing force which is generated by the supply of hydraulic pressure from a hydraulic pump P to the hydraulic actuator 42. Accordingly, the hydraulic actuator 42, actuating plate 43, actuating rods 44 and hydraulic pump P constitute a positioning member drive mechanism which drives the positioning member 41 in a direction toward the central axis C. The positioning member drive mechanism and the positioning member 41 constitute the preform biasing mechanism 40.

This manufacturing apparatus further comprises control unit including an applied pressure sensor 45 which is incorporated in the upper die drive mechanism 33 and a control device 46 having a microcomputer incorporated therein. The pressure sensor 45 detects a pressure applied by the upper die 30, that is a pressure which is applied upon a molten metal within the cavity 18 by the pressurizing and shaping portion 32, based upon the magnitude of the mechanical load when the upper die drive mechanism 33 is actuated, and converts the detected pressure into an electrical signal and outputs it to the control device 46. The control device 46 is electrically connected to the upper die drive mechanism 33 and the hydraulic pump P for electrically controlling them to conduct a sequence control of the disposition of the upper die 30 and the positioning member 41 in accordance with the production schedule of the disc rotors. The control device 46 conducts feedback control of the capacity of the hydraulic pump P, that is the pressure of the positioning member 41 which is generated by the hydraulic actuators 42 with reference to information on the pressure applied upon the upper die 30, input from the pressure sensor 45 when a pressure is applied upon the molten metal by the pressurizing and shaping portion 32 of the upper die.

(Process for Manufacturing Disc Rotor)

A process for manufacturing a disc rotor by the above-mentioned manufacturing apparatus will now be described. As a preparation of the operation of the apparatus, the lower die main body 12, the pressurizing and shaping portion 32 of the upper die and the first and second preforms 4, 5 to constitute the outer and inner composite material portions 64, 65 of the disc rotor are heated up to a predetermined temperature (for example, 200 to 500 C).

When the first and second preforms 4, 5 are set in position of the apparatus, as shown in FIG. 1, the lower die 10 is moved upward to an upper stand-by position by the drive actuators 13 and the movable core assembly 20 is brought into an extended state in which the sliders 17 and the core segments 21 are moved in an outer radial direction with respect to the lower die main body 12 while the upper die 30 is separated upward from the lower die 10 and movable core assembly 20. Since all of the core segments 21 are remote from the central axis C in the extended state, the inner peripheral projections (24, 25) of each core segment 21 will not become an obstacle, so that the preforms 4, 5 can be introduced to the central area of the movable core assembly 20. Then, the first preform 4 is placed on the step 12a of the lower die main body by using a robot arm (not shown). The second preform 5 is held at a level by a distance above the first preform 4 by the robot arm. While the second preform 5 is kept at such a level, the lower die 10 is moved downward by the drive actuators 13 so that the movable core assembly 20 are brought into an assembled state at which the sliders 17 and the core segments 21 are moved in an inner radial direction relative to the lower die main body 12.

Then, as shown in FIG. 2, a part of each core segment 21 is moved to upon the upper face of the first preform 4. The peripheral edge of the upper face of the preform 4 is biased by the core segments 21 so that the preform 4 can not be released (not movable in a vertical direction) from the step 12a of the lower die main body. In synchronization with this, the inner peripheral wall of the disc rotor casting cavity 18 is defined by the vertical front faces 23 of the core segment 21 which are assembled in a position located at a given distance from the central axis C, so that the cavity 18 which opens upward appears and the support projecting portion 24 of each core segment 21 is moved into below the outer peripheral edge of the second preform 5 which is held by the robot arm. The outer peripheral edge of the second preform 5 is placed upon the upper end face 24a of the support projecting portion of each core segment by separating the preform 5 from the robot arm. Subsequently, the robot arm is removed away from the cavity 18. The foregoing operation enables the firm positioning of the first preform 4 and the preliminary positioning of the second preform 5 within the cavity 18 to be completed.

Figure 3A:
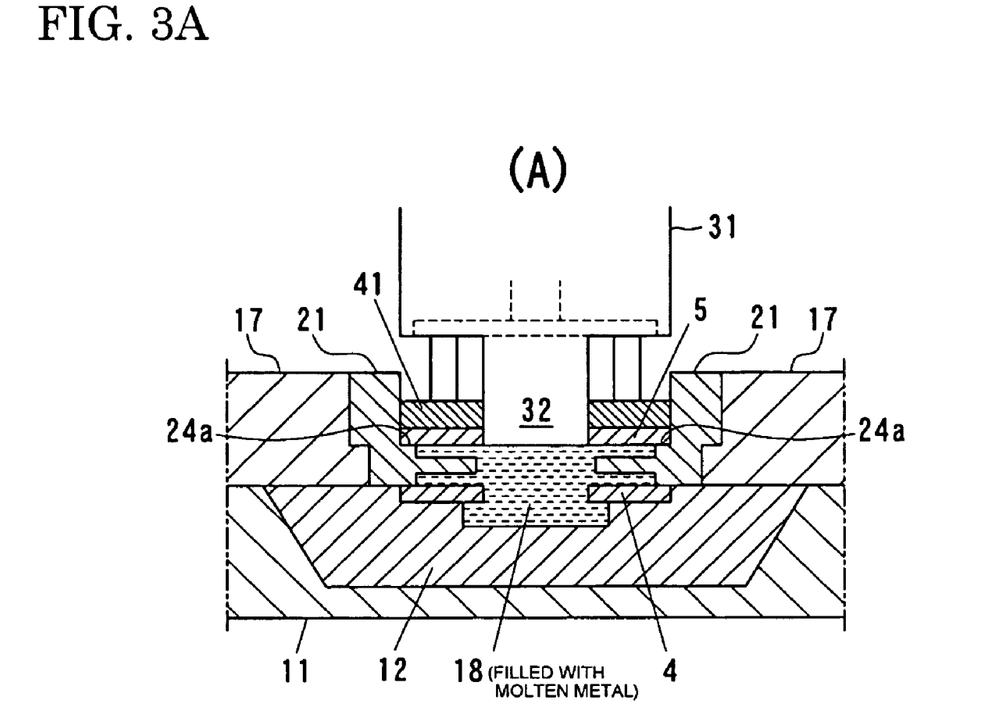
FIG. 3A is a schematic sectional view showing an enlarged cavity and its vicinity of the apparatus for manufacturing a disc rotor when it is pressure-cast.

Subsequently, a molten metal of aluminum or its alloy which becomes a matrix of MMC is poured into the cavity 18 by means of a pouring mechanism (not shown) (refer to FIG. 3A). The molten metal is charged into the cavity 18 until it reaches the level of the second preform 5. Then, the upper die 30 is moved toward the lower die 10 and movable core assembly 20 while the axis of pressurizing and shaping portion 32 is aligned with the central axis C of the cavity 18. Then, as shown in FIG. 3A, the upper die 30 and the preform biasing mechanism 40 associated therewith are moved downward by the upper die drive mechanism 33 to cause the biasing face 41b of the positioning member 41 to abut to the upper face (flat face) of the second preform 5. Then, the peripheral edge of the second preform 5 is sandwiched between the outer peripheral edge of the biasing face 41b and the upper end face 24a of the support projecting portion of each core segment 21, so that the preform 5 becomes unable to move vertically. Thus, the preform 5 is firmly positioned in the cavity 18.

That is, the upper end face 24a of each core segments 21 (the preform supporting portion) has an annular surface which comes into a face-to-face contact with a outer periphery of a lower face of the preform 5 with annular shape, the positioning member 41 has an annular surface which comes into a face-to-face contact with a full upper face of the preform 5 with annular shape.

When firm positioning of the second preform 5 by the positioning member 41 is completed, the outer periphery of the positioning member 41 is brought into close contact with the vertical front face 23 (FIG. 4) of each core segment 21 and the bottom of the pressurizing and shaping portion 32 of the upper die closes the central hole 41a of the positioning member and is moved into and is disposed in the central hole of the second preform 5. As a result, the cavity 18 which is filled with the molten metal is hermetically sealed (the die comprising the lower die 10, core 20 and upper die 30 is closed), so that application of a pressure upon the molten metal has been prepared (refer to FIG. 3A).

Figure 3B:
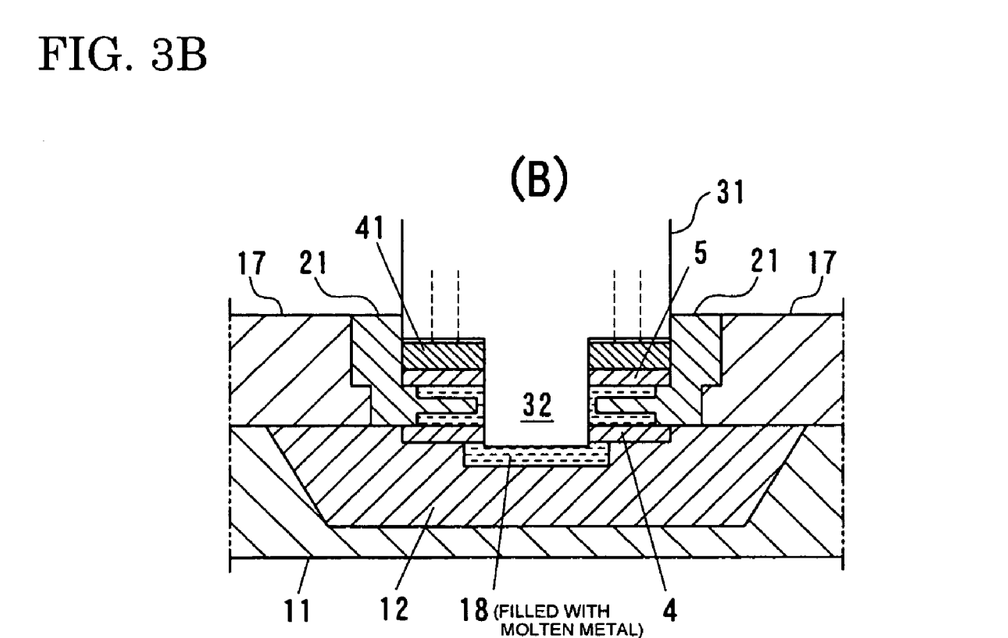
FIG. 3B is a schematic sectional view showing an enlarged cavity and its vicinity of the apparatus for manufacturing a disc rotor when it is pressure-cast.

Subsequently, the pressurizing and shaping portion 32 of the upper die is deeply moved into the cavity 18 for applying a pressure upon the molten metal by further moving the upper die 30 downward by means of the upper die drive mechanism 33 as shown in FIG. 3B. Since the cavity 18 is hermetically sealed as mentioned above—, the molten metal is forced to penetrate into the inside of the preforms 4, 5 and the pressure applied upon the molten metal (that is, the inner pressure in the cavity 18) is gradually increased as the pressurizing and shaping portion 32 is moved into the cavity 18.

At this time, the applied pressure sensor 45 detects the pressure applied upon the molten metal (that is, the inner pressure within the cavity 18) based upon the magnitude of the mechanical load of the upper die drive mechanism 33 which is generated as a result of the reaction of the pressure which is applied upon the molten metal by the pressurizing and shaping portion 32. The control device 46 changes the force applied upon the second preform 5 by the positioning member 41 by adjusting the performance of the hydraulic pump P in step with the change in the pressure applied upon the molten metal, which is detected by the applied pressure sensor 45 after pressure applying step. Specifically, feedback control of the capacity of the hydraulic pump P (that is, biasing force of the positioning member 41) is conducted in such a manner that the pressure of the molten metal which acts upon the second preform 5 in a direction to lift it from the support projecting portion 24 is constantly equal to the pressure applied upon the upper face of the second preform 5 of the positioning member's biasing face 41b, which acts in a direction opposite to that of the lifting pressure during the pressurizing step (pressure increasing step). Thus, shifting of the second preform 5 due to its lifting is prevented from occurring without damaging to the second preform 5 by preventing the pressure difference between the upper and lower sides of the second preform 5 from occurring.

When the pressure applied upon the molten metal (the inner pressure in the cavity 18) reaches a given desired value, downward moving of the upper die 30 is stopped to stop increasing of the inner pressure in the cavity and also to stop increasing of the pressure applied upon the upper face of the second preform 5 of the positioning member's biasing face 41b. Thereafter, pressurizing state is maintained until the molten metal is completely solidified. After the completion of the solidification, the upper die 30 and the preform biasing mechanism 40 are lifted upwardly from the lower die 10 and movable core assembly 20 and the lower die 10 is moved from the lower casting position to the upper stand-by position to extend the movable core assembly 20 (that is, the die is opened). This enables the pressurized cast article (disc rotor intermediate product) to be removed. The pressurized cast article has a plurality of vent hole portions which are marks of vent hole forming portions 25 of each core segment and a central recess which is a mark of the pressurizing and shaping portion 32. An aluminum MMC disc rotor which is shown in FIG. 6 as a final product can be obtained by subjecting the cast article removed from the apparatus to post working such as surface grinding and polishing.

(Effects of the Embodiment)

Since the preforms 4, 5 made of a porous material to constitute the composite material portions 64, 65 of the disc rotor have a specific weight which is generally lighter than that of the molten metal, the preforms (particularly, the second preform 5 in this embodiment) may be lifted in the cavity 18 to cause shifting thereof if a pressure is applied to the molten metal to impregnate the preforms with the molten metal. In contrast to this, in the present embodiment, the pressure applied upon the molten metal by the pressurizing and shaping portion 32 is constantly balanced with the biasing force applied upon the preform 5 by the positioning member 41 by the positioning member's biasing face 41b of the preform biasing mechanism 40 gradually increasing the force to bias the upper face of the second preform 5 in step with an increase in the pressure applied upon the molten metal when a pressure is applied upon the molten metal accommodated in the cavity 18 by the pressurizing and shaping portion 32 of the upper die. Therefore, a pressure difference between the upper and lower face sides of the preform 5 is prevented from occurring. The preform 5 can be retained in desired position in the cavity 18 while preventing the damage of the preform 5 due to the pressure difference.

Since positioning member 41 which constitutes the preform biasing mechanism 40 is in a face-to-face contact with the second preform 5 via the biasing face 41b, the biasing force from the preform biasing mechanism 40 is not concentrated on a very limited local area of the second preform 5. Therefore, there is no fear that the preform biasing mechanism 40 damages the second preform 5.

Since the positioning member 41 which constitutes the preform biasing mechanism 40 can be moved toward or away from the second preform 5 which is supported by the support projecting portion 24 of each core segment 21, the function of the positioning member 41 to sandwich and hold the second preform 5 in association with each support projecting portion 24 is not impaired if the thickness, for example, the second preform 5 is changed. That is, the manufacturing apparatus of the present embodiment has a high freedom degree to cope with a change in the thickness of the second preform 5 and is easy to cope with changes in design of the disc rotor. The apparatus enables to easily cope with changes in thickness of the first preform 4 by replacing the lower die main body 12 with new main body 12 having a step 12a with a depth corresponding to the thickness of the first preform 4.

(Modification)

The foregoing embodiment of the present invention can be modified as follows.

Although the applied pressure sensor 45 which is incorporated in the upper die drive mechanism 33 is used in the foregoing embodiment, pressure detecting means which directly detects the pressure applied upon the molten metal may be provided on the inner wall of the cavity 18 (for example the lower die main body 12). Although a process for manufacturing the ventilated type disc rotor having a plurality of vent holes 63 has been described in the foregoing embodiment, the present invention can be applied to an apparatus for manufacturing a usual solid type disc rotor having no vent holes and a process for manufacturing the same. In this case, a movable core assembly 20 in which vent hole forming projections 25 are removed from each core segment 21 may be used.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. An apparatus for manufacturing a disc rotor made of a metal-based composite material including a preform comprising:

a cavity forming die forming a disc rotor casting cavity for accommodating said preform and a molten metal therein;

a preform supporting portion provided on a part of said cavity forming die to define the position of said preform in said cavity;

a molten metal pressurizing unit for applying a pressure upon the molten metal accommodated in said cavity; and a preform biasing mechanism which is provided so that it can be relatively moved toward and away from said preform supported by said preform supporting portion; said preform biasing mechanism having a biasing face which can be in a face-to-face contact with a flat face of said preform; said preform biasing mechanism being adapted to position said preform in said cavity in conjunction with said preform supporting portion and to prevent the shifting of said preform due to an increase in the pressure upon the molten metal by biasing said preform via said biasing face on application of a pressure upon said molten metal by said molten metal pressurizing unit.

2. An apparatus for manufacturing a disc rotor as defined in claim 1, wherein said molten metal pressurizing unit comprises:

a substantially cylindrical pressurizing and shaping portion for shaping a central recess of said disc rotor while applying a pressure upon said molten metal accommodated in said cavity; and a pressurizing and shaping portion drive mechanism for driving said pressurizing and shaping portion in a direction along a central axis of said cavity so that said pressurizing and shaping portion is movable toward or away from said cavity.

3. An apparatus for manufacturing a disc rotor as defined in claim 2, wherein said preform biasing mechanism comprises:
- positioning member having said biasing face and an annular shape which enables said positioning member to be fitted on said substantially cylindrical pressurizing and shaping portion from an external position, said positioning member being movable in a direction along the central axis of said cavity independently of said pressurizing and shaping portion; and
- positioning member drive mechanism for driving said positioning member in a direction along the central axis of said cavity so that said positioning member can be moved toward or away from said preform supported by said preform supporting portion.

4. An apparatus for manufacturing a disc rotor as defined in claim 1, wherein said apparatus further comprises control unit which is electrically or mechanically connected to at least said preform biasing mechanism and detects a pressure which is applied upon said molten metal by said molten metal pressurizing unit for controlling a biasing force of said biasing face applied upon said preform depending upon the pressure applied on the molten metal.

5. An apparatus for manufacturing a disc rotor as defined in claim 1, wherein said cavity forming die at least comprises:
- a lower die which forms a bottom wall of a cavity and a movable core assembly provided on said lower die for forming the inner side wall of said cavity;
- said movable core assembly comprising a plurality of core segments which are disposed in an annular manner around the central axis of said cavity and are movable in a radial direction of said cavity; said movable core assembly selectively assuming either one of an extended state in which all the core segments are moved in an outer radial direction to allow the preform to be introduced into said cavity and an assembled state in which all the core segments are moved in an inner radial direction to form an inner peripheral side wall of said cavity; and
- all or some of the plurality of core segments being formed on the inner periphery thereof with said preform supporting portion.

6. A process for manufacturing a disc rotor made of a metal-based composite material including a preform comprising:
- providing an apparatus comprising a cavity forming die which forms a disc rotor casting cavity, a preform supporting portion which is provided on a part of said cavity forming die, a molten metal pressurizing die for applying a pressure upon a molten metal accommodated in said cavity and a preform biasing mechanism having a biasing face which can be in a face-contact with a flat face of said preform,
- a preparatory step for bringing the biasing face of said preform biasing mechanism into a face-to-face contact with the flat face of said preform supported by said preform supporting portion to position said preform in said cavity; and
- a step of applying a pressure upon said molten metal accommodated in said cavity by said molten metal pressurizing die; at said pressurizing step the pressure applied upon said molten metal by said pressurizing die being constantly balanced with a biasing force applied upon the preform by said preform biasing mechanism by gradually increasing the force for biasing the flat face of said preform by a biasing face of said preform biasing mechanism in step with an increase in pressure applied upon the molten metal by said pressurizing die.

7. An apparatus for manufacturing a disc rotor made of a metal-based composite material including at least one preform comprising:
- a cavity forming die and a core disposed in said die to form a disc rotor casting cavity for accommodating said preform and a molten metal therein;
- a molten metal pressurizing unit for applying a pressure upon the molten metal accommodated in said cavity;
- a preform supporting portion provided on a part of said core to support a lower face of said preform;
- a preform positioning member to abut to an upper face of said preform and to bias said preform between said preform supporting portion and said preform positioning member;
- a preform positioning member drive mechanism for biasing said preform positioning member toward said preform;
- an applied pressure sensor for detecting a pressure on said preform positioning member via said preform applied by said molten metal, which is poured into said cavity and are pressurized by said molten metal pressurizing unit;
- a control device for controlling said applied pressure on said preform applied by said preform positioning member drive mechanism with reference to information on said applied pressure input from said applied pressure sensor.

8. An apparatus for manufacturing a disc rotor as defined in claim 7, wherein said cavity forming die comprises a lower die and an upper die;
- that said molten metal pressurizing unit is disposed in a center portion of said upper die to be movable into said cavity, and
- that said preform positioning member has an annular shape and is disposed around said molten metal pressurizing unit in said upper die to be vertically movable.

9. An apparatus for manufacturing a disc rotor as defined in claim 7, wherein said preform has an annular shape;
- said preform supporting portion having an annular surface which comes into a face-to-face contact with an outer periphery of a lower face of said preform of annular shape,
- said preform positioning member having an annular surface which comes into a face-to-face contact with an upper face of said preform of an annular shape.

* * * * *